United States Patent [19]
Baker et al.

[11] Patent Number: 5,533,353
[45] Date of Patent: Jul. 9, 1996

[54] METHOD AND APPARATUS FOR CONTROLLING THE CLUTCH OF AN AIR CONDITIONER SYSTEM

[75] Inventors: Gary L. Baker, Carleton; Steven M. Jakubiec, Bloomfield; Brian E. Agar, Bloomfield Hills, all of Mich.; Erik Brom, Winona, Minn.

[73] Assignee: Chrysler Corporation, Auburn Hills, Mich.

[21] Appl. No.: 357,505

[22] Filed: Dec. 16, 1994

[51] Int. Cl.$^6$ .................................................. F25D 21/04
[52] U.S. Cl. ............................. 62/227; 62/161; 62/180
[58] Field of Search ........................... 62/227, 228.1, 62/228.3, 229, 180, 186, 157, 161, 163, 208, 209, 243, 244, 231, 323.4, 150; 165/42, 43

[56] References Cited

U.S. PATENT DOCUMENTS

| | | | |
|---|---|---|---|
| 4,132,086 | 1/1979 | Kountz | 62/209 |
| 4,507,932 | 4/1985 | Suzuki et al. | 62/180 |
| 4,748,819 | 6/1988 | Takahashi | 62/161 |
| 5,065,589 | 11/1991 | Taguchi | 62/89 |
| 5,182,915 | 2/1993 | Iida et al. | 62/161 |
| 5,199,274 | 4/1993 | Yoshida et al. | 62/228.4 |
| 5,216,895 | 6/1993 | Kawai et al. | 62/133 |
| 5,218,836 | 6/1993 | Jarosch | 62/227 |
| 5,295,363 | 3/1994 | Oomura et al. | 62/227 |
| 5,323,619 | 6/1994 | Kim | 62/160 |
| 5,331,821 | 7/1994 | Hanson et al. | 62/133 |
| 5,335,514 | 8/1994 | Hennessee et al. | 62/227 |
| 5,467,605 | 11/1995 | Hennessee et al. | 62/227 X |

Primary Examiner—Harry B. Tanner
Attorney, Agent, or Firm—Christopher A. Taravella

[57] ABSTRACT

A method and an apparatus are provided for variably controlling the temperature at which the clutch of an air conditioner compressor is engaged and disengaged. The temperature at which the compressor clutch is engaged and disengaged is based on an average minimum temperature at the evaporator over a clutch cycle, wherein the clutch disengage temperature is increased if the average minimum temperature is below a first predetermined temperature and is decreased if the average minimum temperature is above a second predetermined temperature, thus maintaining the average minimum temperature within a temperature range. Further, the clutch disengage temperature is adjusted based on user operated air conditioner control settings. The clutch disengage temperature is adjusted to a higher temperature if a low blower speed is selected by the user and is adjusted to a lower temperature if a high blower speed is selected. The clutch engage or turn on temperature is derived from the clutch disengage or turn off temperature and may in fact be set lower than the turn off temperature.

22 Claims, 13 Drawing Sheets

METHOD AND APPARATUS FOR CONTROLLING THE CLUTCH OF AN AIR CONDITIONER SYSTEM

FIELD OF THE INVENTION

The present invention relates to the control of the outlet temperature of an air conditioner system, and, more particularly, to a method and apparatus that provides variable control of an air conditioner compressor clutch.

BACKGROUND OF THE INVENTION

In typical automotive air conditioner systems, a clutch is mounted on a compressor in order to intermittently transmit the rotational motion of an automobile engine to the drive shaft of the compressor. Such systems are disclosed in U.S. Pat. No. 5,065,589 to Taguchi and U.S. Pat. No. 5,199,274 to Yoshida et al., both incorporated herein by reference. In such systems, the clutch is controlled in response to the temperature sensed at the evaporator, with the temperature at which the clutch is engaged and disengaged set to fixed temperatures. The temperatures are fixed so that the system will not accumulate ice, no matter what the blower speed. Even though the system can be safely operated at a much colder temperature when the blower speed is on a high setting, the control temperature for the clutch will be fixed to temperature at which the system will safely operate even at the lowest blower speed setting. Therefore, optimum cooling performance is not achieved, especially at high blower speed settings.

U.S. Pat. No. 5,323,619 to Kim discloses a method of controlling the starting patterns of a compressor. In particular, the disclosed method provides for the variation of the starting frequency of the compressor in a combined heating and cooling system. The frequency varies in response to the comparison of the outdoor temperature to a reference temperature.

U.S. Pat. No. 5,199,274 to Yoshida et al. is directed to an air conditioner system having a means to control a compressor in response to the detection of electrical generator saturation. That is, when generator saturation is detected, the compressor speed is decreased thus preventing a sudden drop in the voltage from the generator upon engagement of the clutch which would adversely effect other equipment connected to the generator.

SUMMARY OF THE INVENTION

It is an object of the present invention to provide an air conditioner system that optimizes cooling performance.

It is another object of the invention to provide for colder outlet temperatures at higher blower speed.

According to an illustrative embodiment of the invention, a method and an apparatus are provided for variably controlling the temperature at which the clutch of an air conditioner compressor is engaged and disengaged. The temperature at which the compressor clutch is engaged and disengaged is based on an average minimum temperature at the evaporator over a clutch cycle, wherein the clutch disengage temperature is increased if the average minimum temperature is below a first predetermined temperature and is decreased if the average minimum temperature is above a second predetermined temperature. This maintains the average minimum temperature within a particular range. Further, the clutch disengage temperature is adjusted based on user operated air conditioner control settings. The clutch disengage temperature is adjusted to a higher temperature if a low blower speed is selected by the user and is adjusted to a lower temperature if a high blower speed is selected. The clutch engage or turn on temperature is derived from the clutch disengage or turn off temperature and may in fact be set lower than the turn off temperature.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
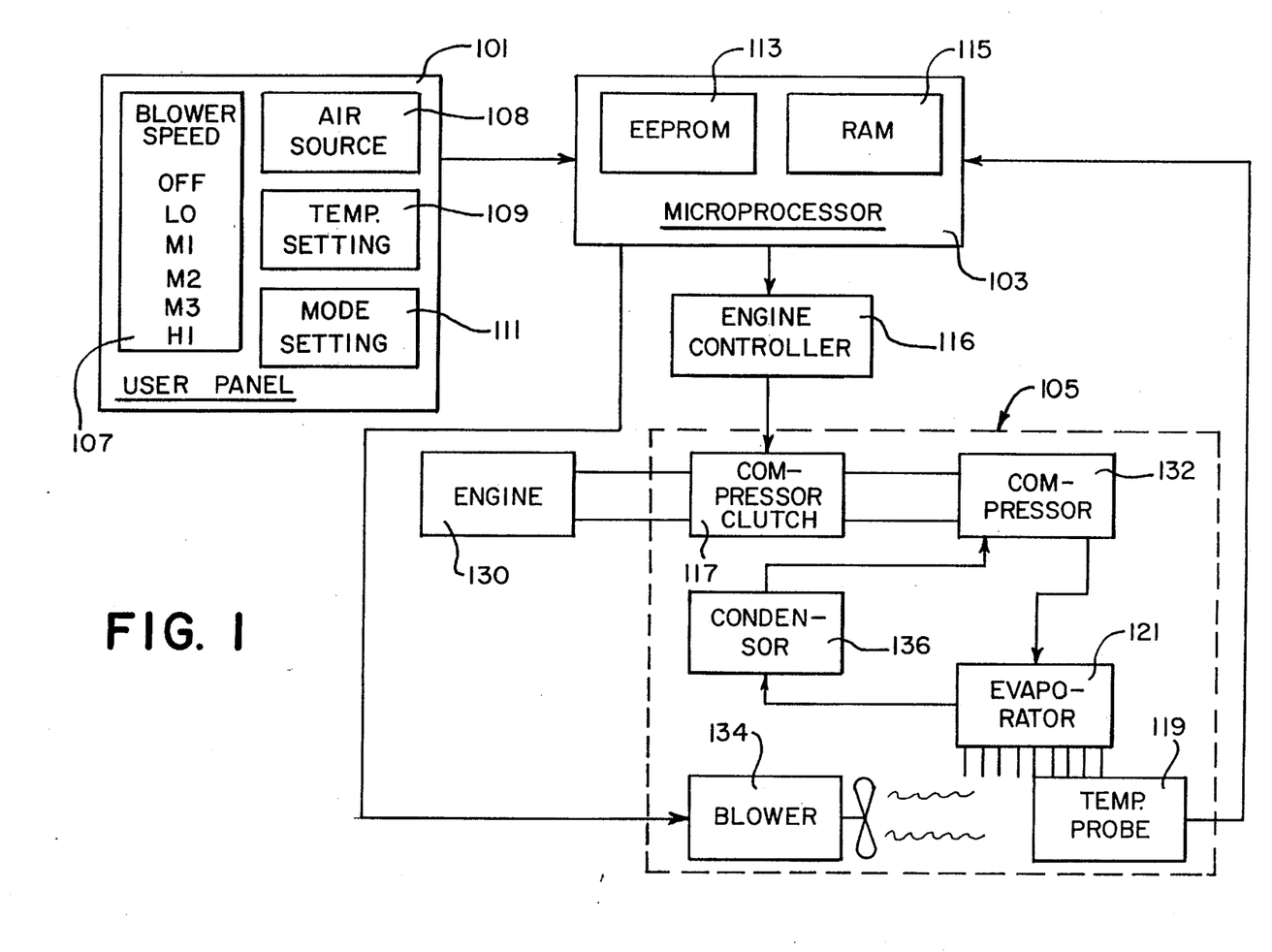
FIG. 1 is a block diagram of the apparatus embodying the present invention.

FIG. 1 is a block diagram illustrating a preferred embodiment of the invention. Referring to FIG. 1, a microprocessor 103 having both EEPROM 113 and RAM 115 is communicatively connected to both a user panel 101 and an air conditioner system 105 so as to provide control signals to the air conditioner system 105 in response to the user panel 101.

The air conditioner system 105 includes a compressor clutch 117 for intermittantly applying the rotational motion of an automobile engine 130 to the drive shaft of a compressor 132. Upon engagement of the clutch 117, the compressor 132 compresses a coolant thereby reducing its boiling point or temperature, and transmits the compressed coolant to an evaporator 121. The evaporator 121 causes the coolant to evaporate to a change in pressure which changes the liquid into a gas, the change in phase causing cooling of the evaporator fins 122. These fins evaporator 122 cool air blown passed the evaporator 121 by a blower 134. The cooled air exits the system into the interior of an automobile through air conditioner ducts (not shown) leading to air outlets or vents (not shown). The evaporated coolant is transferred to a condensor 136 that condenses the coolant back to a liquid, completing the cycle.

The user panel 101 includes a blower speed control 107, an air source control 108, a temperature control 109, and a mode control 111 to allow the user to select among different "comfort" settings. In particular, the blower speed control 107 provides the user with a means to request a selected air conditioner blower speed and to communicate the selection to the microprocessor 103, the blower speeds available for selection being an OFF condition, a low speed LO, a first medium speed M1, a second medium speed M2, a third medium speed M3, and a high speed HI.

The air source control 108 allows the user to indicate to the microprocessor 103 the source of air to be used by the air conditioner system. The user may select air outside the vehicle, OUTSIDE, or may select the air inside the vehicle, RECIRC. RECIRC may be chosen if, for example, the user desires the interior temperature to be cool and the air inside the vehicle is cooler than the air outside the vehicle.

The temperature control 109 allows the user to set, via the microprocessor 103, the relative temperature of the air to be provided by the air conditioner system 105. The temperature of the air is preferably adjustable between a maximum warm temperature and a maximum cold temperature using a slide control which is slidably adjustable in a horizontal direction. A warm temperature may be selected by sliding the control to the right and a cold temperature may be selected by sliding the control to the left. When the control is positioned all the way to the left, the control is in a "COLD STOP" position.

The mode control 111 allows the user to select the MODE or outlet for the conditioned air. Preferably, the user can select: a PANEL mode that forces the conditioned air through an outlet positioned on the dashboard of the vehicle so as to face the user; a DEFROST mode that forces the conditioned air through an outlet positioned on the dashboard near a windshield so as to direct air onto the windshield; a FLOOR mode which forces the conditioned air through an outlet positioned below the dashboard and toward the floor of the vehicle; a BILEVEL mode which forces air through both the FLOOR mode outlet and the PANEL mode outlet; and a MIX mode which forces air through both the DEFROST mode outlet and the FLOOR mode outlet.

As indicated above, the microprocessor 103 provides control signals to the air conditioner system 105. In particular, the microprocessor 103 controls the compressor clutch 117 via an engine controller 116, causing it to engage and disengage, i.e., turning on or off the compressor 132, respectively. The microprocessor is also communicatively connected to a temperature probe 119 positioned at the fins of the air conditioner evaporator 121. The temperature probe 119 transmits signals representing temperature measurements to the microprocessor 103.

FIGS. 2–7 and 9–10 illustrate the preferred method of controlling the compressor clutch 117. Each of the procedures illustrated in these figures will be described in conjunction with the state diagram of FIG. 8. All references to 800-series elements will be found in FIG. 8.

Figure 2A:
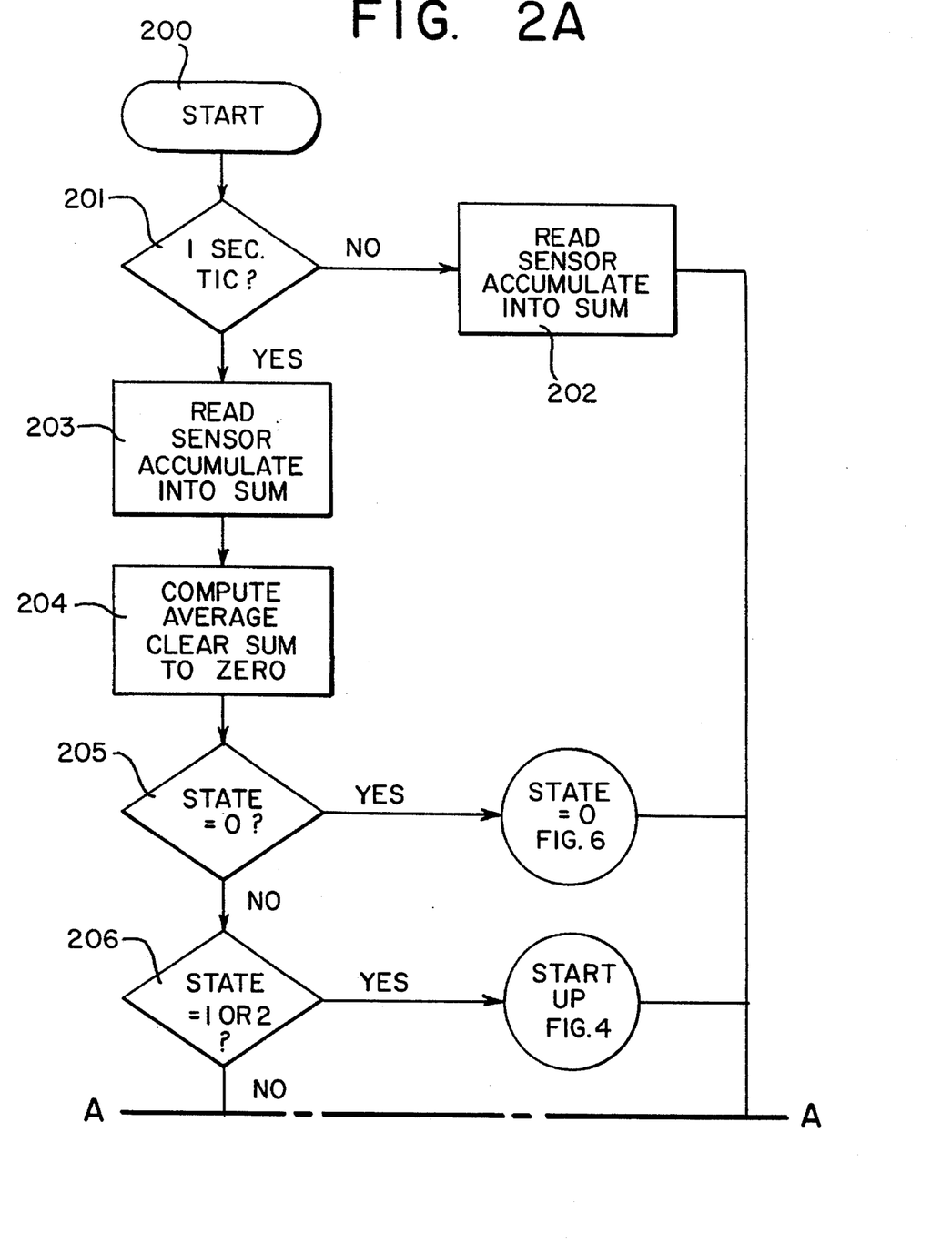
FIGS. 2–7, and 9–10 are flowcharts illustrating the preferred method of the present invention.
Figure 2B:
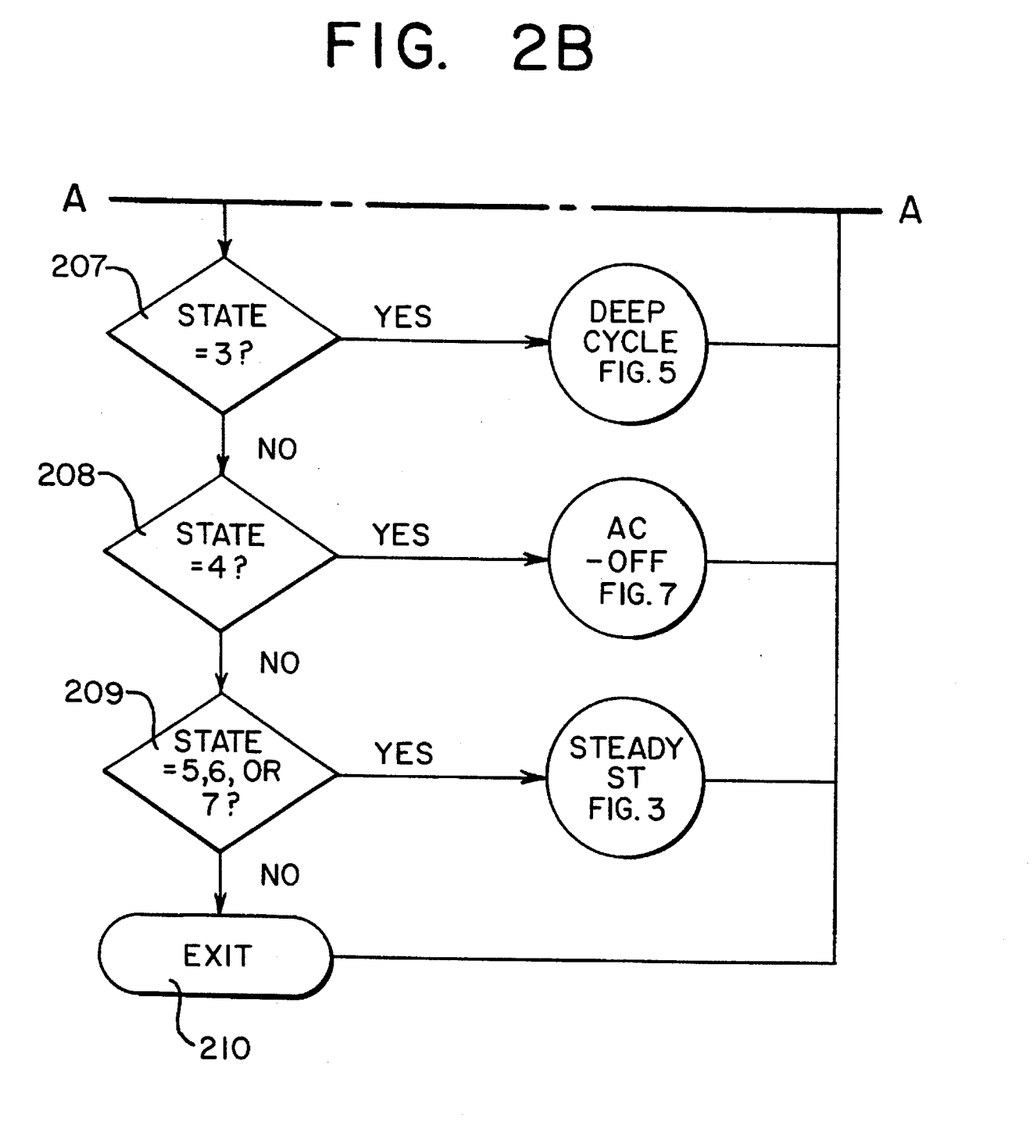

The procedure illustrated in FIGS. 2A and 2B is preferably executed by the microprocessor 103 every one-tenth of a second while the air conditioner system 105 is operating, with the temperature average being determined at every one-second interval. The microprocessor 103 preferably keeps track of elapsed time and stores it in the RAM 115.

Referring to FIG. 2, after the procedure starts (step 200), a determination is made as to whether a one-second interval has passed (step 201). If not, a temperature reading is taken by the microprocessor 103 via the probe 119 and is accumulated into a sum (step 202), and the process ends (step 210). If a one-second interval has passed, a temperature reading is taken and is accumulated into a sum as in step 203 and further, an average temperature is computed (step 204). That is, the sum of the temperatures taken over the one-second interval is divided by 10 to give an average temperature, and the sum is then cleared (step 204). It is apparent, therefore, that the average temperature is not a running average, but is instead the average temperature over only the one second interval. It should be noted here, however, that the average temperature is also separately accumulated for the purpose of determining a running average, the use of which will be discussed later.

Figure 3A:
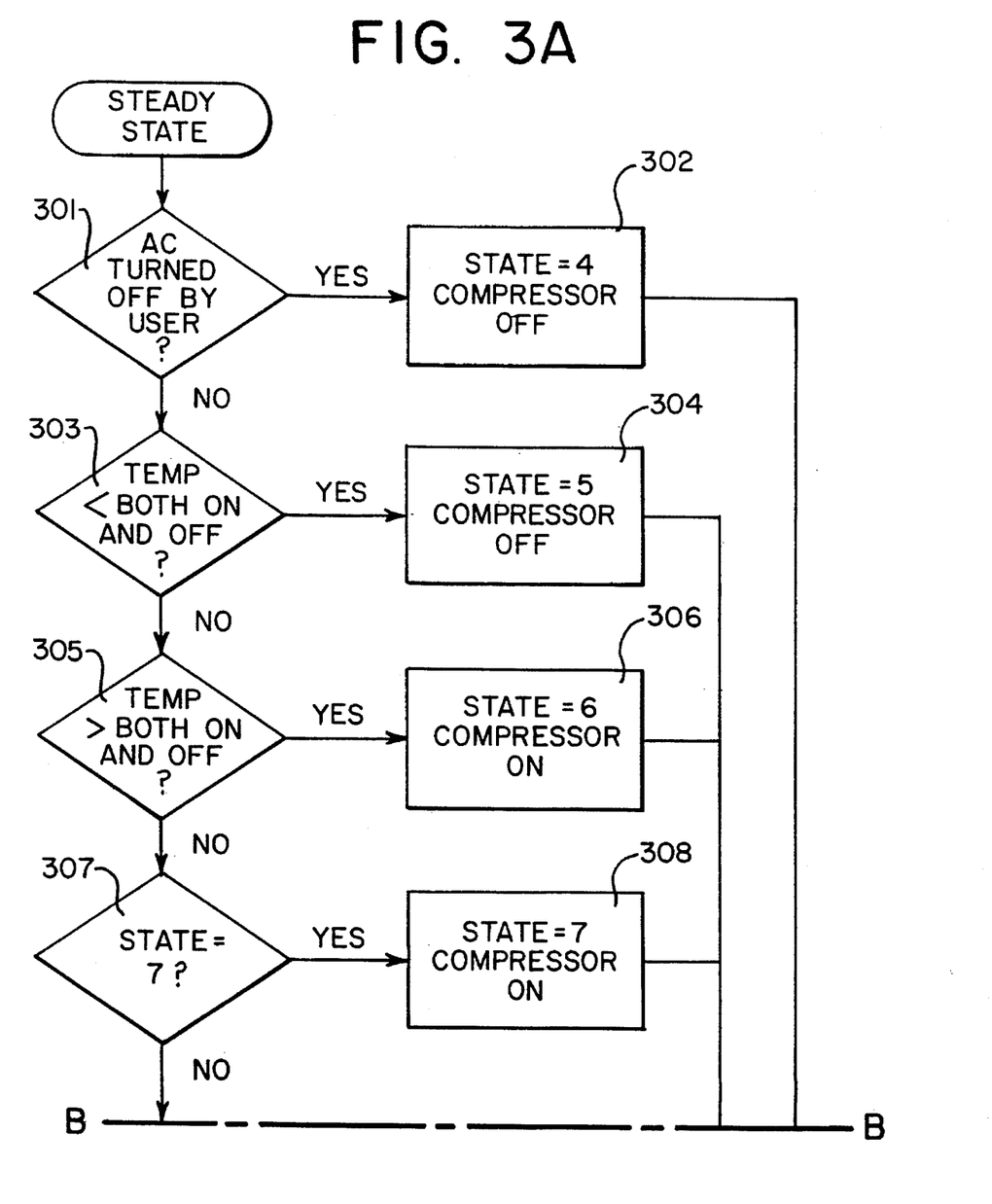
Figure 3B:
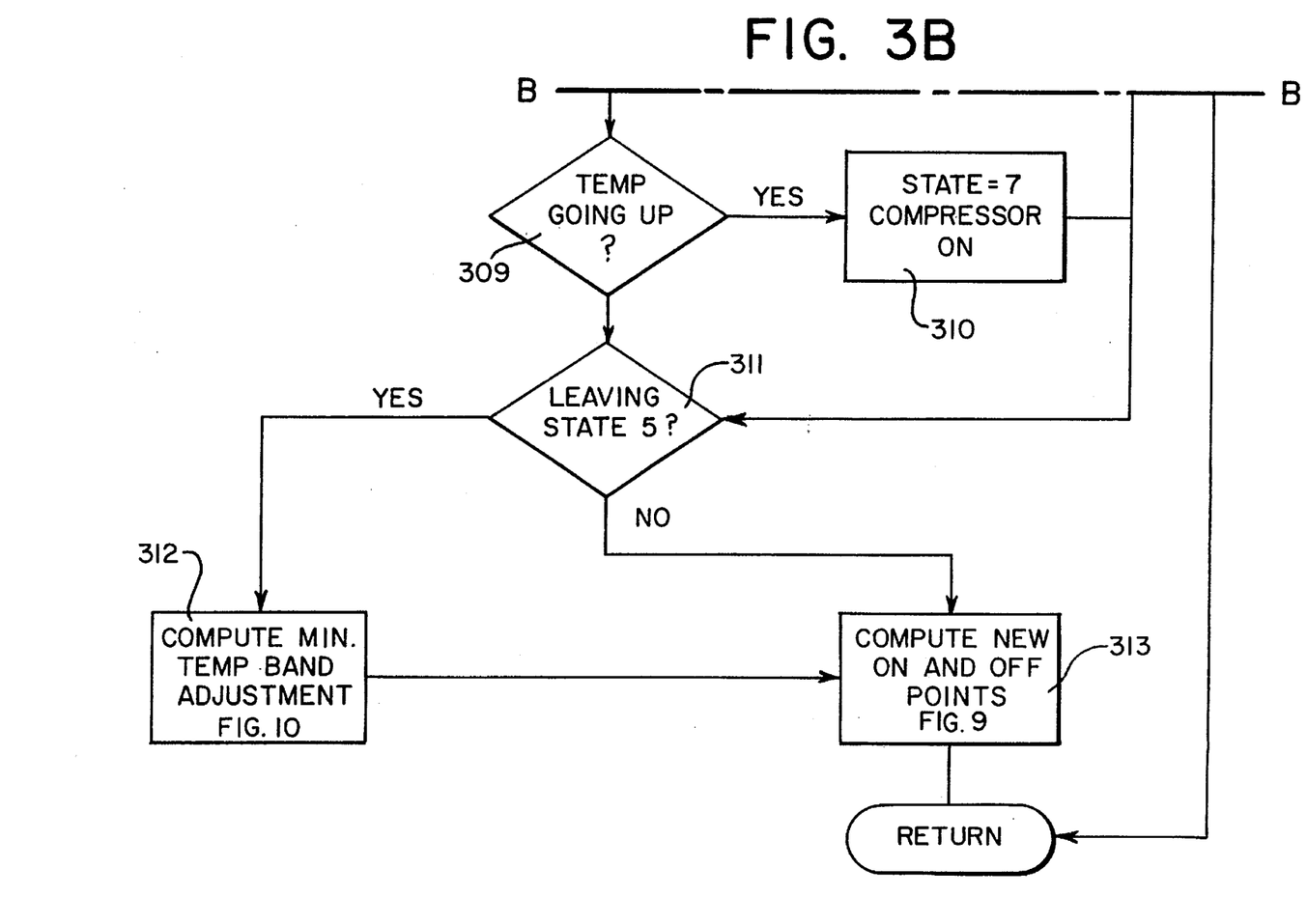
Figure 4:
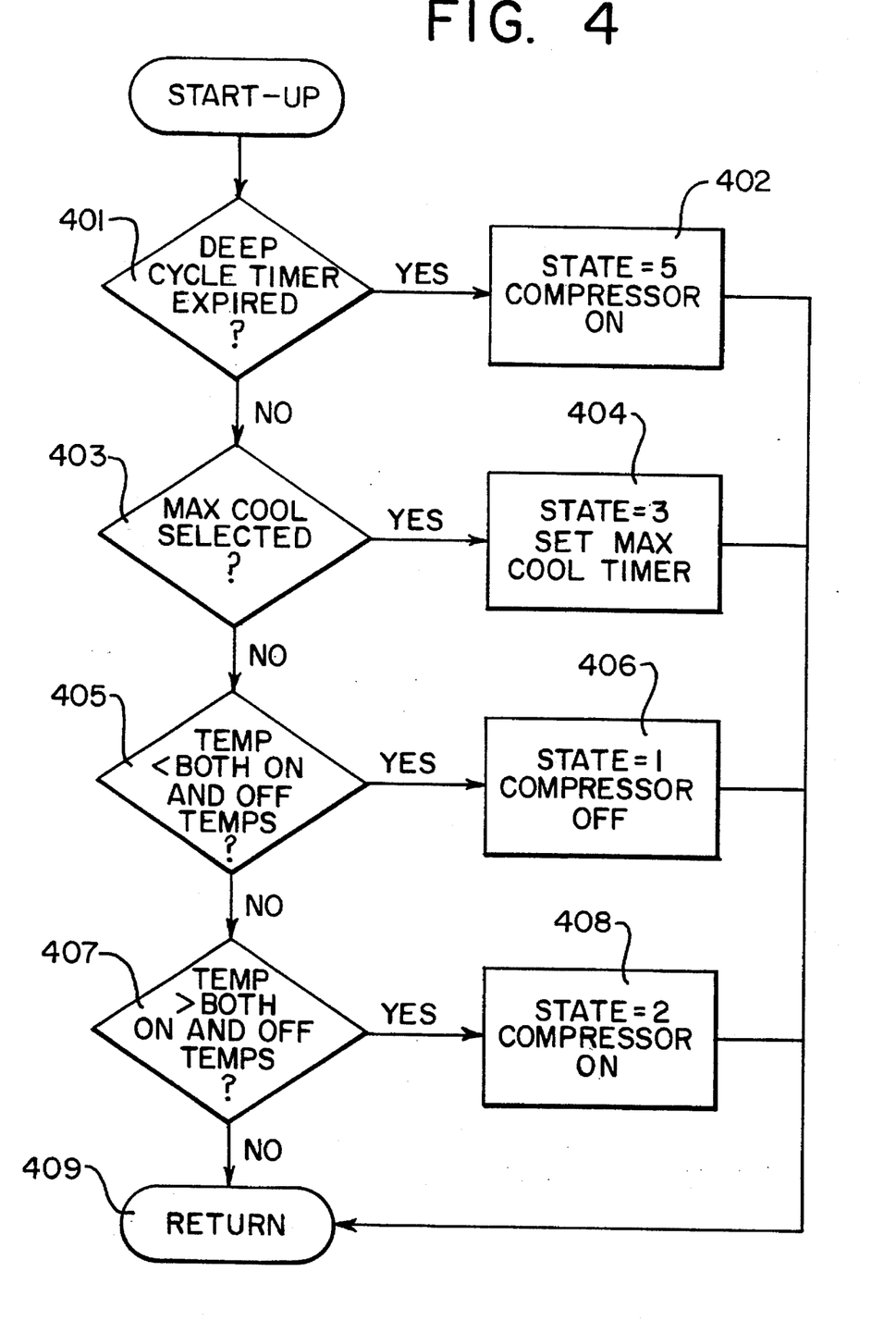
Figure 5:
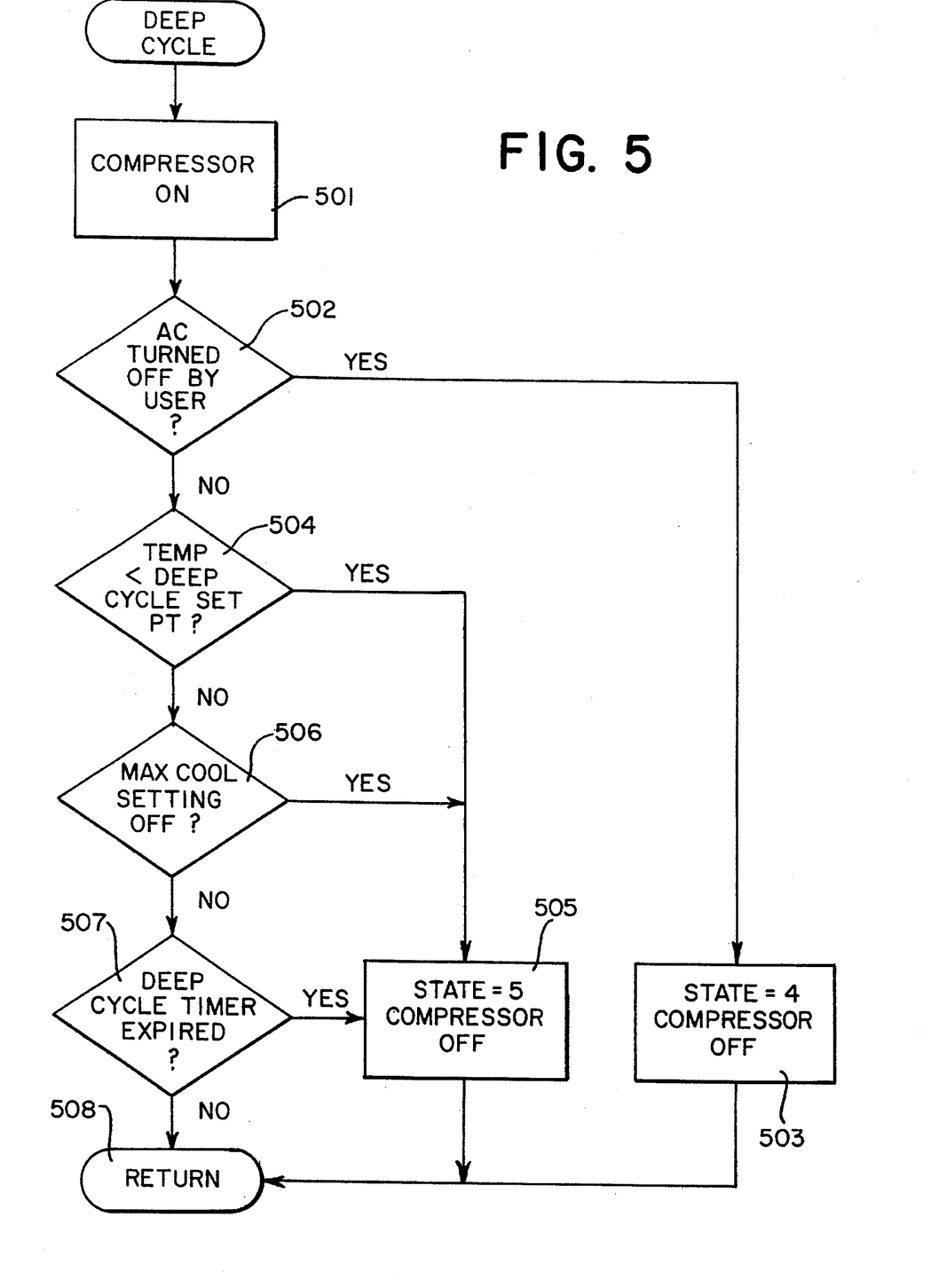
Figure 6:
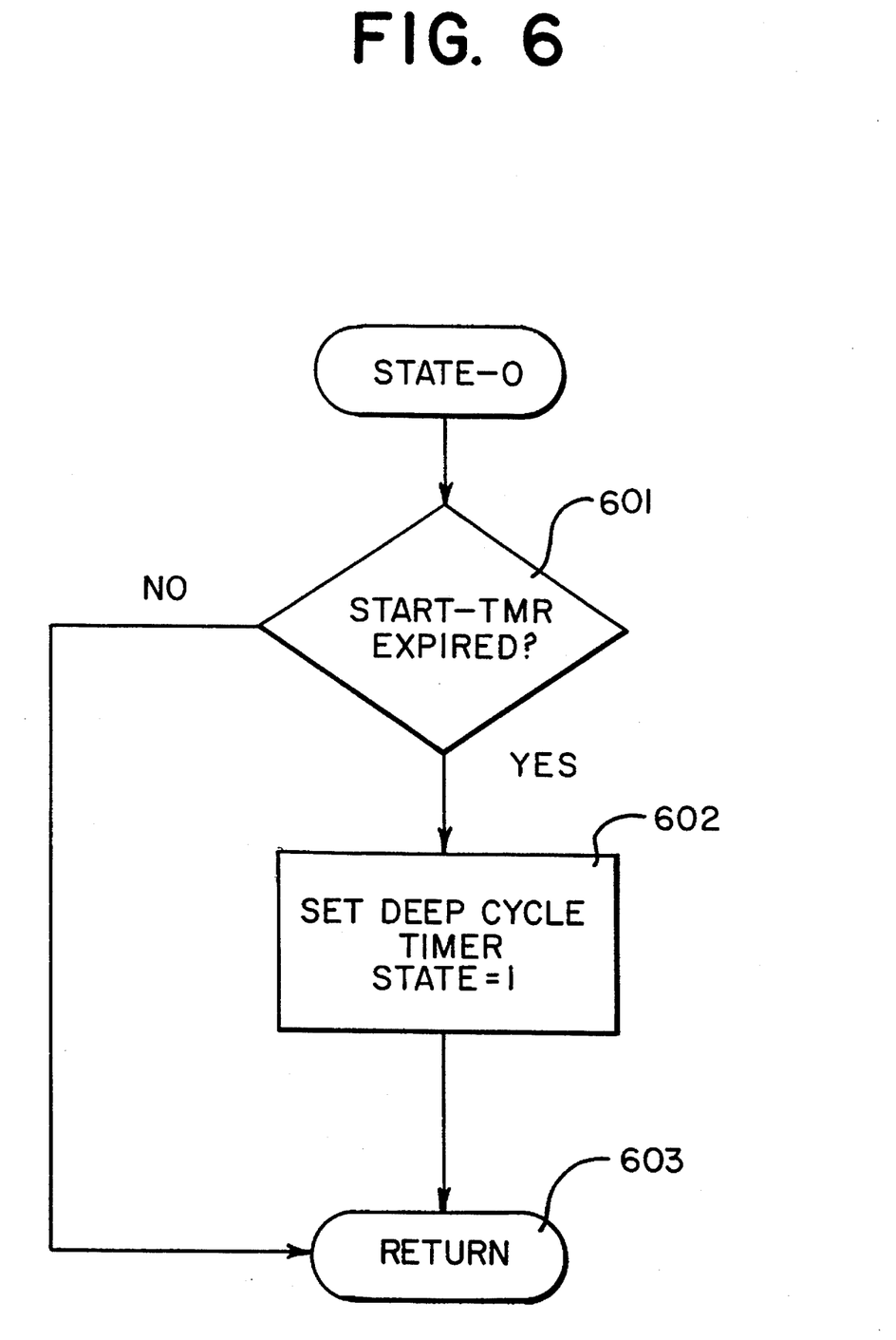
Figure 7:
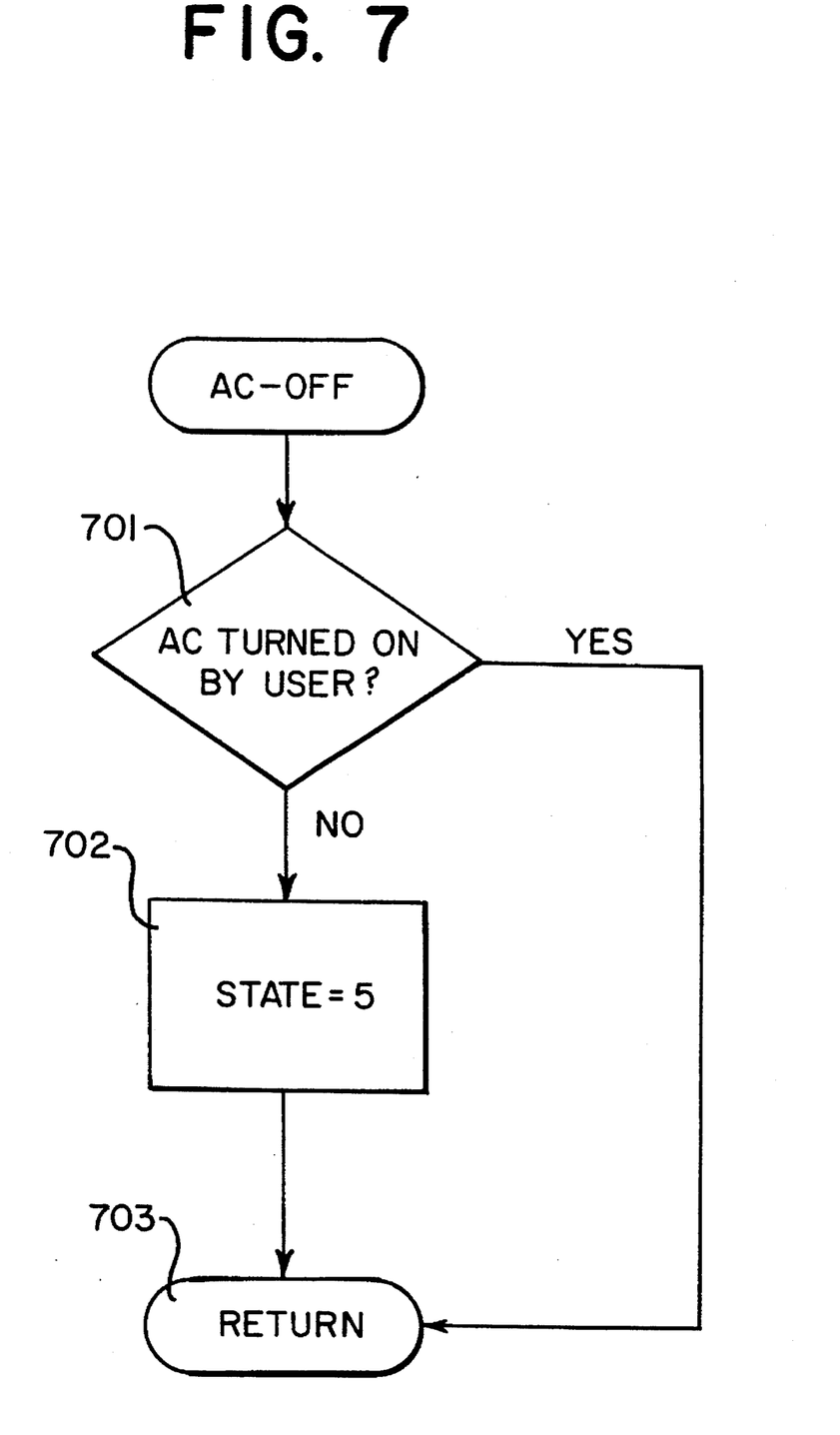
Figure 8:
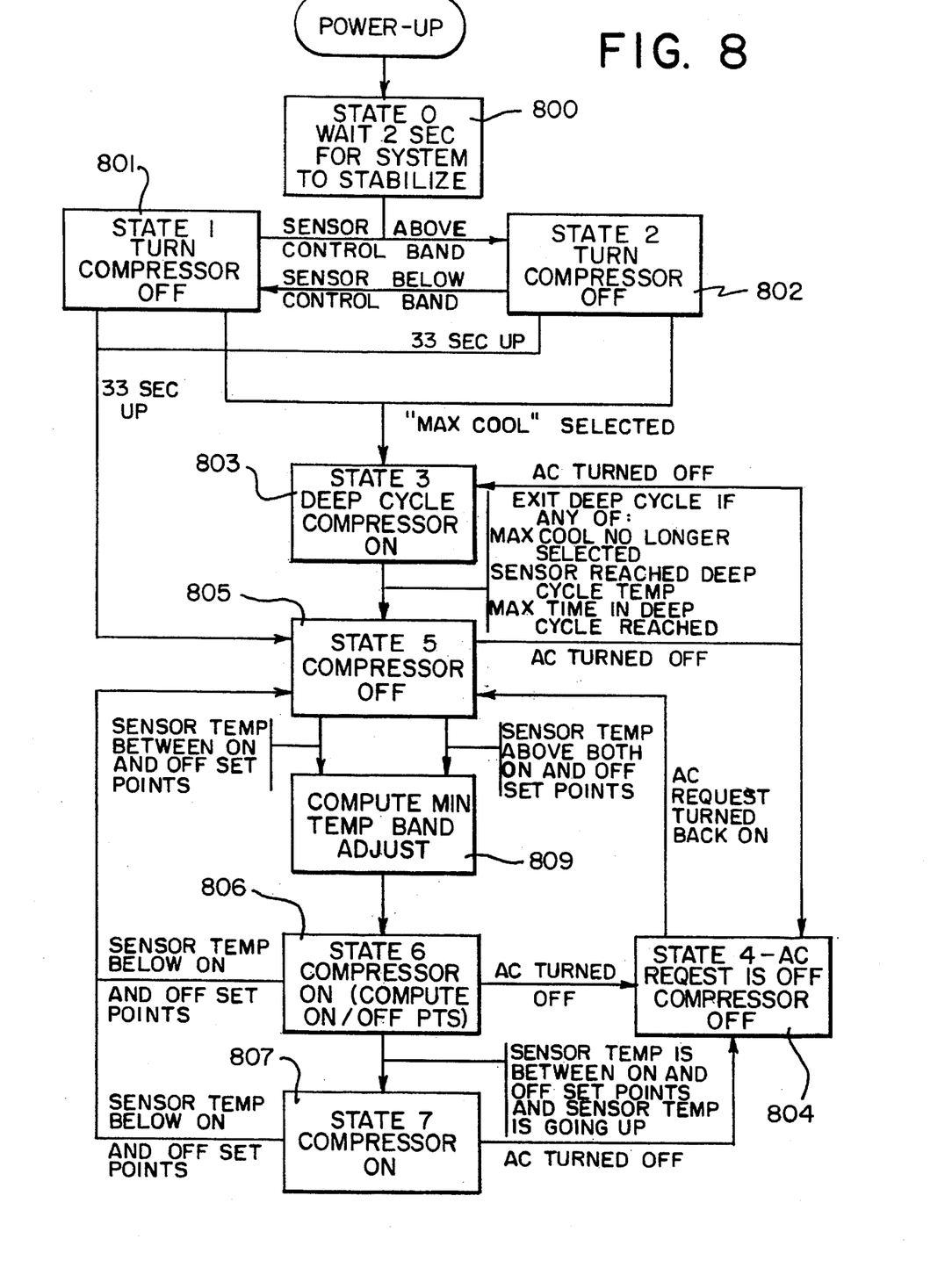
FIG. 8 is a finite-state model of the operation of a preferred embodiment of the present invention.

Next, a determination is made as to what "state" the system is in (steps 205–209). The microprocessor 103 preferably stores the current state of the system in the RAM 115. If the current state of the system is zero, the STATE-0 procedure of FIG. 6 is performed (step 205). If the state of the system is 1 or 2, the START-UP procedure of FIG. 4 is performed (step 206). If the state of the system is 3, the DEEP CYCLE procedure of FIG. 5 is performed (step 207). If the system is in STATE 4 (804), the AC-OFF procedure of FIG. 7 is performed (step 208). Finally, if the system is in STATE 5, 6, or 7, the STEADY-ST procedure of FIGS. 3A and 3B is preformed (step 209). Each of the above-mentioned procedures will be described in detail later. After one of the above procedures is executed, the process of FIGS. 2A and 2B ends (step 210). As noted above, the procedure of FIGS. 2 and 2B is executed every one-tenth of a second, thus at the next one-tenth interval, the procedure begins again at step 200.

At power up, and only before the first execution of the procedure of FIGS. 2A and 2B, the air conditioner system begins in STATE 0 (800), and a two second timer is started. The purpose of the two second timer is to allow the system to stabilize. Since the system is in STATE 0 (800), at step 205 of FIG. 2A the STATE-0 procedure of FIG. 6 is preformed. Referring now to FIG. 6, a determination is made as to whether the two second timer has expired (step 601). If the timer has not expired, the system remains in STATE 0 (800) and the procedure returns to the procedure of FIGS. 2A and 2B (step 603) at the point at which it left and thus proceed to end the procedure at step 210. If however the timer has expired, a thirty-three second "deep cycle" timer (the deep cycle will be described later) is started and the system is transitioned to STATE 1 (801) (step 602) and the procedure returns to the procedure of FIGS. 2A and 2B (step 603) at the point at which this subroutine was called.

Referring again to FIG. 2A, at the next one-tenth second interval, when the process reaches step 206, if the system is in STATE 1 (801), the STARTUP procedure of FIG. 4 is performed. The average temperature at the evaporator is computed in step 204 of FIG. 2A. Next, the system checks to see whether the "deep cycle" timer has expired (step 401). The thirty-three second "deep cycle" timer is used to keep the system in its present state. That is, if the "deep cycle" timer has not expired, the state of the system will not change at this point. If the "deep cycle" timer has expired, the system is set to STATE 5 (805), the compressor clutch 117 is engaged (step 402) and the procedure returns to the procedure of FIG. 2 (step 409).

Next, a determination is made as to whether "MAX COOL" conditions were selected (step 403). "MAX COOL" is selected when the user has adjusted the settings of the air conditioner to select a maximum cool temperature, the blower speed is set to M3 or HI, and the mode selected by the user is PANEL or BILEVEL. Assuming "MAX COOL" has been selected, the compressor clutch 117 is engaged, the state of the system is set to 3 (803), a "max cool" timer is set (step 404), and the procedure returns to the procedure of FIG. 2 (step 409). If "MAX COOL" has not been selected, the average temperature at the evaporator (computed in step 204) is compared to the ON and OFF temperatures (step 405). The ON and OFF temperatures refer to the temperatures at which the microprocessor 103 engages and disengages, or turns on and off the compressor clutch 117. The ON and OFF temperatures are preferably initialized at 37° F. and 42° F., respectively. One of ordinary skill in the art will note that the clutch ON temperature is lower than the clutch OFF temperature, but will understand that the system will work successfully since there is a large amount of "coast" after the compressor changes states. That is, when the compressor is disengaged, the system will continue to get colder before it begins to get warmer.

If the average temperature from step 204 of FIG. 2 is less than both the ON and OFF temperatures, the compressor clutch 117 is disengaged by the microprocessor 103, the state of the system is set to 1 (step 406) (801), and the procedure returns to the procedure of FIG. 2 (step 409) at the point at which the subroutine was called. If the average temperature is greater than both the ON and OFF temperature (step 407), the compressor clutch 117 is engaged and the state is set to 2 (step 408) (802) and the procedure returns to the procedure of FIG. 2 (step 409). If the average temperature is between the ON and the OFF temperatures, that is, the average temperature it is not less than both the ON and OFF temperatures (step 405) and is not greater than both the ON and OFF temperatures (step 407), the procedure returns to the procedure of FIG. 2 (step 409) at the point at which this subroutine was called.

At the next one-tenth second interval, if the system is set to STATE 2 (802) (step 206 of FIG. 2), the START-UP procedure of FIG. 4 is again performed. If instead, the state of the system is 3 (803) (step 207), the "DEEP CYCLE" procedure of FIG. 5 is performed. Referring now to FIG. 5, when the system is in the DEEP CYCLE state, or STATE 3 (803), rapid cooling is required. The system enters this state only when "MAX COOL" has been selected as can be clearly seen in the state diagram of FIG. 8. In this state, the compressor clutch 117 is engaged (step 501). Next, a determination is made as to whether the user has turned off the air conditioner (step 502). If the air conditioner has been turned off by the user, that is, the user has set the blower control 107 to the off position, the state is set to 4 and the compressor clutch 117 is disengaged (step 503).

If the user has not turned the air conditioner off, the average temperature from step 204 of FIG. 4 is compared to a "DEEP CYCLE SET POINT" (step 504). The "DEEP CYCLE SET POINT" is a temperature normally lower than both the ON and OFF temperatures. As indicated above, the DEEP CYCLE procedure is executed only when "MAX COOL" has been selected. Thus, the system will allow the evaporator 121 to drop to a lower temperature than both the ON and OFF temperatures. In particular, the DEEP CYCLE SET POINT is preferably set to 28° F. If the average temperature is less than the DEEP CYCLE SET POINT, the system is set to STATE 5 (805), the compressor clutch 117 is disengaged (step 505), and the procedure returns to the procedure of FIGS. 2A and 2B (step 508).

If the average temperature is not less than the DEEP CYCLE SET POINT, a determination is made as to whether the user has changed the air conditioner settings so that "MAX COOL" is no longer selected (step 506). If "MAX COOL" is no longer required, the system state is set to 5 (805), the compressor clutch 117 is disengaged (step 505), and the procedure returns to the procedure of FIGS. 2A and 2B (step 508).

If "MAX COOL" is still required, the DEEP CYCLE TIMER is checked to see if it has expired (step 507). If so, the state of the system is set to 5 (805) and the compressor is disengaged (step 505). Otherwise, the system remains in its current state.

As is clear from a quick review of the "DEEP CYCLE" procedure, the system will leave the compressor on, until the average temperature drops below the DEEP CYCLE SET POINT or the DEEP CYCLE TIMER has expired, or the user has turned off the "MAX COOL" setting. This provides for cooling down of the interior of the vehicle as quickly as possible.

If, as a result of step 503 of FIG. 5, (or step 302 of the STEADY-STATE procedure of FIG. 3 described later), the system is in STATE 4 (804) at the next execution of the procedure of FIGS. 2A and 2B, step 208 of FIG. 2B, an AC-OFF procedure of FIG. 7 is called or performed. The AC-OFF procedure is performed only when the user has requested that the air conditioner system be turned off. Referring to FIG. 7, a determination is first made as to whether the user has requested that the air conditioner system be turned on again (step 701), if not, the compressor clutch 117 remains disengaged, the system remains in STATE 4 (804) (step 702), and the procedure returns to the procedure of FIGS. 2A and 2B (step 703). If, however, the user has in fact requested that the air conditioner system be turned on again, the state is set to 5 (805) (step 702), and the procedure returns to the procedure of FIGS. 2A and 2B (step 703).

Finally, if the state of the system at step 209 of FIG. 2 is 5 (805), 6 (806), or 7 (807), the STEADY-STATE procedure of FIGS. 3A and 3B is preformed. Referring now to FIGS. 3 and 3B, a determination is made as to whether the user requested that the air conditioner be turned off (step 301). If so, the system is set to STATE 4 (804) and the compressor clutch 117 is disengaged (step 302). If the user has not requested that the air conditioner be turned off, the average temperature from step 204 of FIG. 2A is compared to the ON and OFF temperatures. If the average temperature is less than both the ON and OFF temperatures (step 303), the system is set to STATE 5 (805) and the compressor is disengaged (step 304). If instead the average temperature is greater than both the ON and OFF temperatures (step 305), the state is set to 6 (806) and the compressor clutch is engaged (step 306).

If the average temperature is between the ON and OFF temperatures, and the system is currently in STATE 7 (step 307)(807), the state of the system remains unchanged and the compressor clutch 117 is engaged (step 308). If the system is not in STATE 7 (807) and the average temperature has increased (step 309), the system state is set to 7 (807) and the compressor clutch 117 is engaged (step 310). The determination of whether the average temperature is increasing is easily made by comparing the present average temperature with the previous average temperature which is preferably stored in RAM 115.

If the average temperature is not going up, a test is made to determine whether the system is making a transition from STATE 5 (805) to another state (step 311). That is, whether, upon entry into the STEADY-STATE procedure, the system was in STATE 5 (805) and has now been reset to a different state. It should be noted from FIG. 3 that step 311 is also performed after each of steps 302, 304, 306, 308, and 310.

Figure 9:
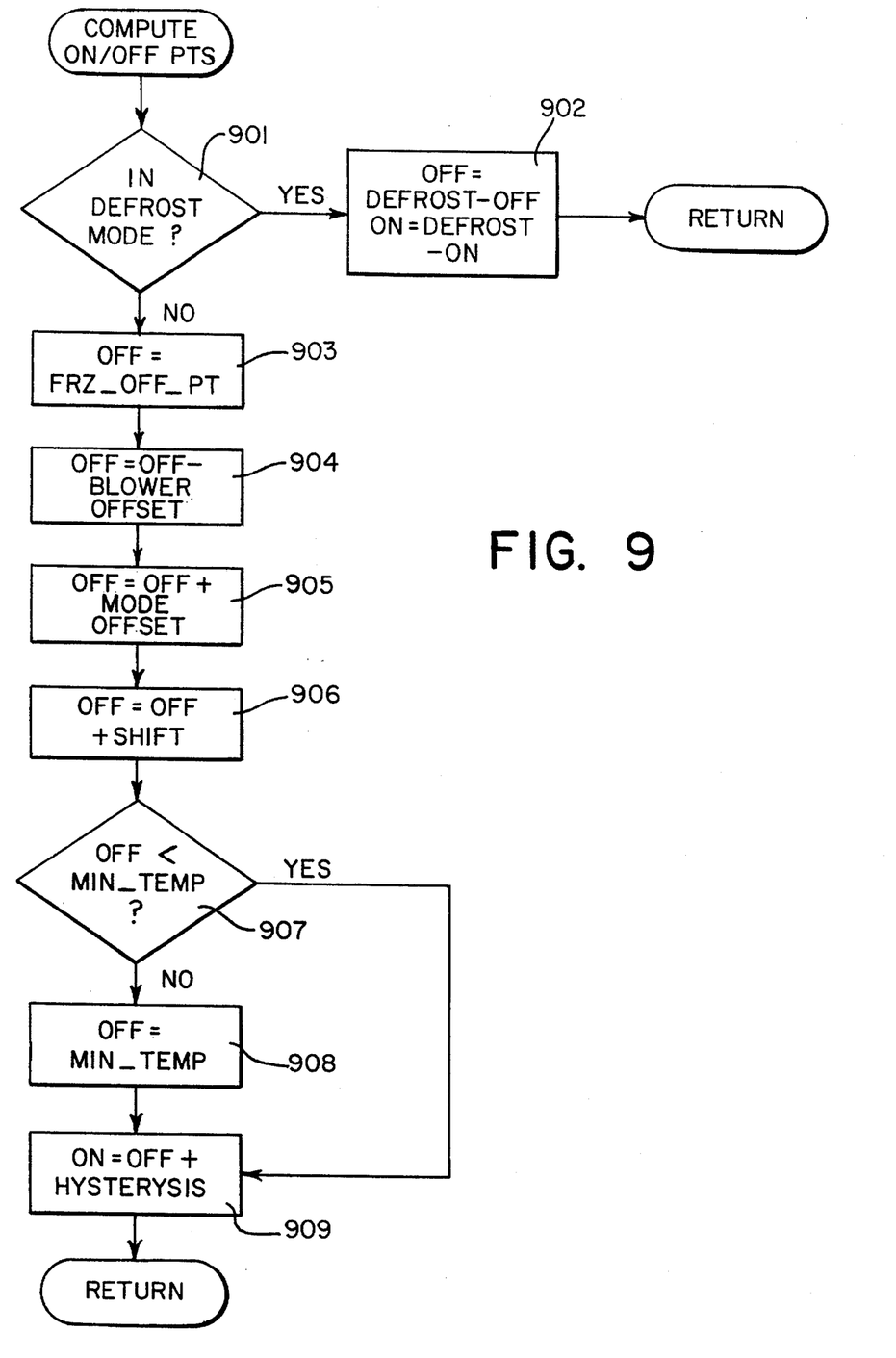

If the system is not transitioning from STATE 5 (805) to another state, new compressor clutch ON and OFF temperatures are computed (step 313) as illustrated in the flowchart of FIG. 9. Referring to FIG. 9, a determination is made as to whether the user has set the system mode to MIX or DEFROST (step 901). If so, the compressor clutch ON and OFF temperatures are set to predetermined temperatures stored in EEPROM 113, DEFROST_ON and DEFROST_OFF respectively (step 902). DEFROST_ON is preferably 39° F. while DEFROST_OFF is preferably 38° F.

If the system is not set to DEFROST, the OFF temperature is set to a predetermined temperature, FRZ_OFF_PT (step 903), preferably 42° F. and stored in EEPROM 113. Next, a blower offset is subtracted from the OFF temperature (step 904). The blower offset compensates for blower speed. That is, since the system can run at colder temperatures at a higher blower speed, the blower offset provides a means to adjust the compressor clutch OFF temperature according to the blower speed. Thus, a blower offset associated with each slower speed setting is preferably stored in a table in EEPROM 113. The following table, TABLE 1, illustrates the preferred blower offset for each of the blower speeds.

TABLE 1

| Blower Speed | Blower Offset |
| --- | --- |
| LO | 0.0° F. |
| M1 | 0.5° F. |
| M2 | 1.0° F. |
| M3 | 8.0° F. |
| HI | 10.0° F. |

Therefore, for example, if the blower speed is M3, 8° F. is subtracted from the OFF temperature.

Next, a mode offset is added to the OFF temperature (step 905). The mode offset is an adjustment to the compressor clutch OFF temperature which compensates for the various mode settings selected with the mode control 111. The following table, TABLE 2, illustrates the preferred mode offset associated with each of the MODE settings.

TABLE 2

| Mode | Mode Offset |
| --- | --- |
| DEFROST | 1.9° F. |
| MIX | 1.9° F. |
| FLOOR | 1.9° F. |
| BILEVEL | 0.0° F. |
| PANEL | 0.0° F. |

Therefore, if the MODE is set to FLOOR, 1.9° F. is added to the compressor clutch OFF temperature. It should be noted that if the temperature control 109 in FIG. 1 was not set to the "COLD STOP" position, a predetermined cold stop temperature, preferably 2° F., is compared to the mode offset, the new mode offset being set to the larger of the two temperatures. Thus, if the temperature control 109 in FIG. 1 is not set to the "COLD STOP" position, and the MODE is set to FLOOR, since 2° F. is larger than 1.9° F., mode offset is set to 2° F.

Next, the OFF temperature is adjusted by a SHIFT value (step 906). The SHIFT value, initially set to zero when the air conditioner system is turned on, is incrementally adjusted based on the average minimum temperature at the evaporator and a temperature band. The SHIFT value will be discussed in greater detail later.

The OFF temperature is then compared to a minimum temperature, MIN_TEMP stored in EEPROM 113 of FIG. 1 (step 907). MIN_TEMP represents a predetermined minimum temperature that the compressor clutch OFF temperature should not go below. MIN_TEMP is preferably set to 32° F. If the OFF temperature is less than MIN_TEMP, the OFF temperature is set to the value of MIN_TEMP (step 908).

Finally, the compressor clutch ON temperature is determined from the OFF temperature (step 909). The ON temperature is set to the OFF temperature plus a predetermined value stored in EEPROM 113, HYSTERYSIS (step 909). HYSTERYSIS may be either a positive or negative value and is preferably set to −5.0° F. Therefore, the ON temperature is preferably 5° F. less than the OFF temperature.

Figure 10:
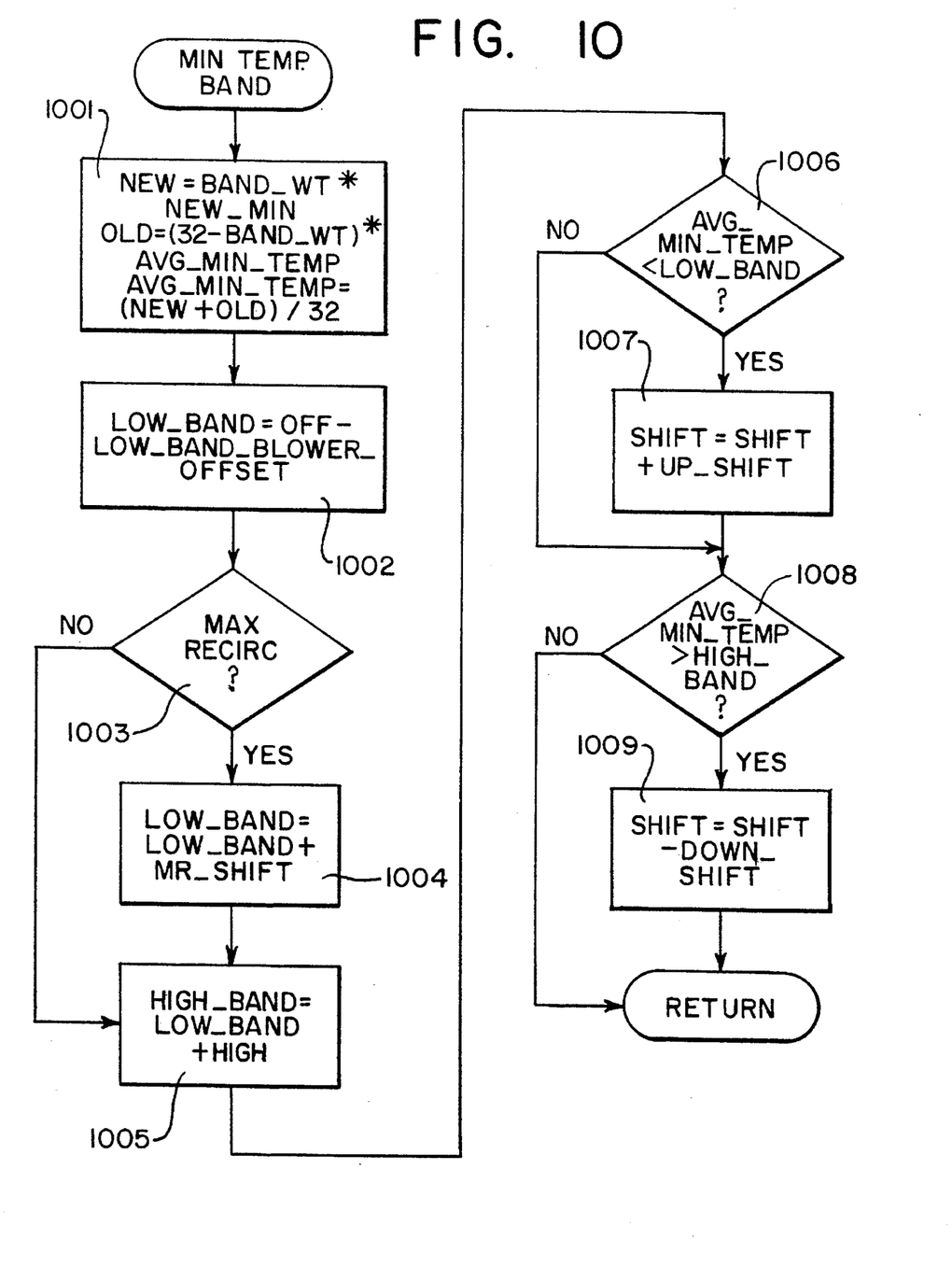
Figure 11:
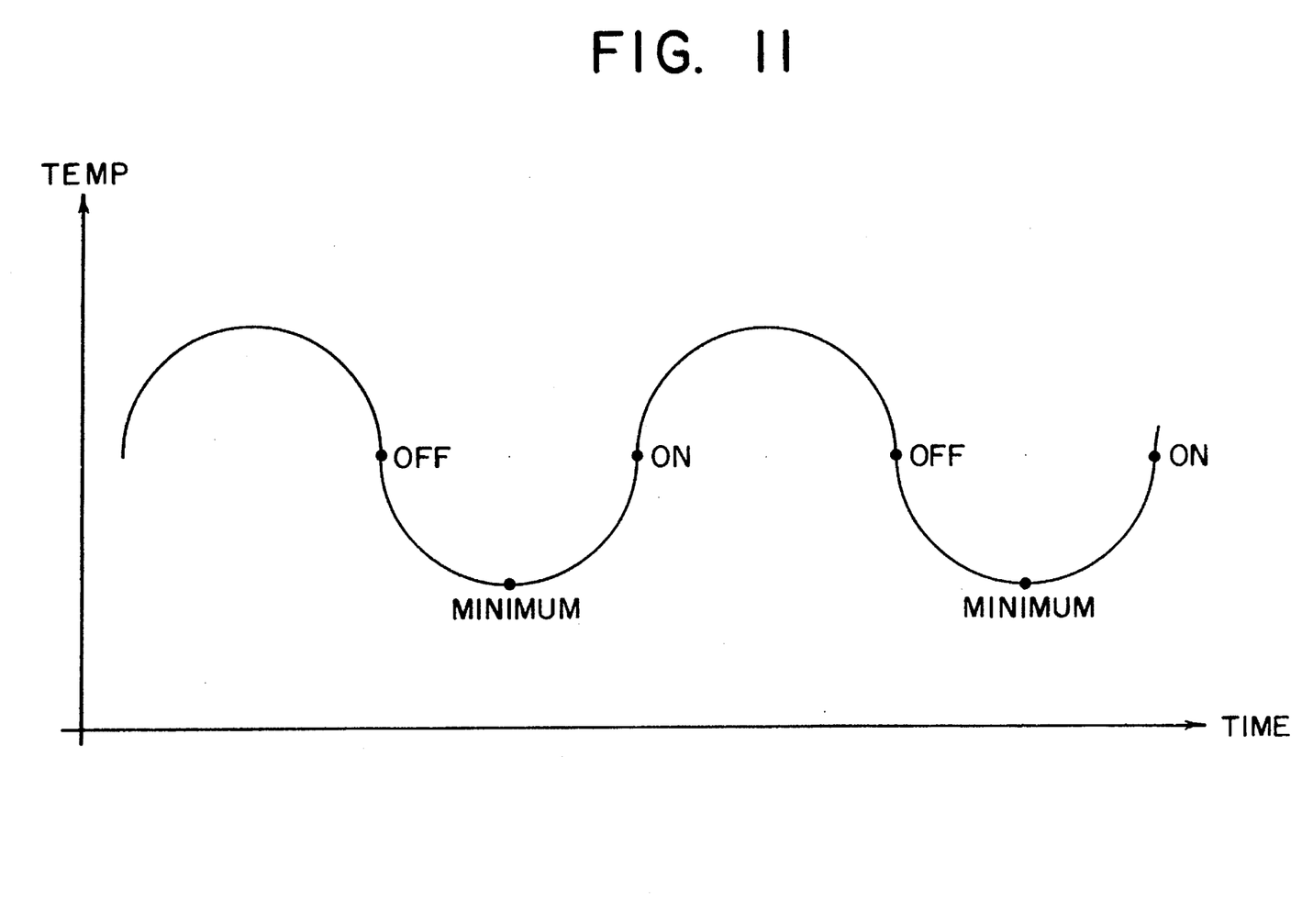
FIG. 11 is a graph illustrating two clutch cycles.

Referring again to FIGS. 3A and 3B, if the system is transitioning from STATE 5 (805) to another state, a new mininimum temperature band, and a new SHIFT value are computed (step 312) as illustrated in FIG. 10. Referring to FIG. 10, a weighted average minimum temperature, AVG_MIN_TEMP is calculated (step 1001). First, a value NEW is determined by multiplying NEW_MIN by a weighting factor BAND_WT (preferably equal to 5). NEW_MIN is the minimum temperature that the evaporator reached during the last compressor clutch cycle, that is, since the compressor clutch 117 was last disengaged. The minimum temperature is stored in RAM 115 of FIG. 1 and is continually updated by the microprocessor 103 during each compressor clutch cycle. FIG. 11 illustrates two compressor clutch cycles.

A second value OLD is also calculated (step 1001). OLD is the last calculated AVG_MIN_TEMP multiplied by a weighting factor. The weighting factor in this case is 32 minus the BAND_WT. Finally, the new AVG_MIN_TEMP is calculated by adding OLD to NEW and dividing by 32 (step 1001).

Next, temperature band values are calculated. The temperature band values represent a range of temperatures that the average minimum temperature, AVG_MIN_TEMP, should optimally fall within. First, the low edge of the temperature band LOW_BAND is calculated (step 1002). Specifically, LOW_BAND is set to the compressor clutch OFF temperature minus a blower speed offset designated as LOW_BAND_BLOWER_OFFSET. In EEPROM 113, a table of values is stored associating a low band blower offset with each of the blower speed settings. The following table, TABLE 3, illustrates the preferable table of blower offsets used to determine the LOW_BAND temperature value.

TABLE 3

| Blower Speed | Low Band Blower Offset |
| --- | --- |
| LO | 7.0° F. |
| M1 | 7.0° F. |
| M2 | 7.0° F. |
| M3 | 1.0° F. |
| HI | 1.0° F. |

Next, a determination is made as to Whether the air conditioner system is in "MAX RECIRCULATION" mode (step 1003). The system is in "MAX RECIRCULATION" mode when the air source 108 of FIG. 1 is set to RECIRC, the temperature control 109 is set to "COLD STOP", the mode control 111 is positioned to PANEL or BILEVEL and the blower speed control 107 is set to HI. If the system is in "MAX RECIRCULATION" mode, the low edge of the temperature band is adjusted, specifically, a predetermined adjustment value, designated as MR_SHIFT and preferably set to −2.0° F. in EEPROM 113, is added to LOW_BAND (step 1004). The upper limit of the temperature band HIGH_BAND is then calculated. HIGH_BAND is preferably LOW_BAND plus a predetermined band width HIGH, preferably set to 1.0° F.

Having determined the temperature band limits LOW_BAND and HIGH_BAND, a determination is made as to whether the average minimum temperature, AVG_MIN_TEMP calculated in step 1001, falls within the band limits, if not, the SHIFT value is adjusted. SHIFT is a value that is ultimately added to the compressor clutch OFF temperature as an adjustment so as to attempt to increase or decrease the average minimum temperature value. One of ordinary skill in the art will understand that an adjustment to the clutch OFF temperature will cause the minimum cycle temperature to change, thereby ultimately changing the average minimum temperature.

In step 1006 of the flow chart of FIG. 10, AVG_MIN_TEMP is compared to the low edge of the temperature band, LOW_BAND. If AVG_MIN_TEMP is less than LOW_BAND, the air conditioner system's minimum temperatures are too low, thus the clutch OFF temperature should be increased. Therefore, SHIFT is increased by a value UP_SHIFT, which is preferably 0.2° F. (step 1007). If AVG_MIN_TEMP is greater than HIGH_BAND (step 1008), the air conditioner system's minimum temperatures are too high, thus the clutch OFF temperature should be lowered. SHIFT is therefore decreased by a value DOWN_SHIFT, preferably set to 0.2° F. (1009).

As is clear from the above description, the compressor clutch OFF and ON temperatures are adjusted so as to keep the average minimum temperature as measured at the evaporator within a predetermined temperature range or band. Both the temperature band and the OFF and ON temperatures are dependant on the settings of the air conditioner system as well as past and present temperature measurements. This allows the system to run efficiently.

While the present invention has been particularly shown and described with reference to preferred embodiments thereof, it will be understood by those skilled in the art that various changes in form and details may be made therein without departing from the spirit and scope of the invention.

What is claimed is:

1. A method of controlling a compressor clutch of an air conditioner system having an evaporator and a blower comprising the steps of:

monitoring a temperature at the evaporator;

determining an average minimum temperature based on the monitored temperature;

disengaging the clutch when the monitored temperature decreases to a first control temperature;

engaging the clutch when the monitored temperature increases to a second control temperature;

comparing the average minimum temperature to a first predetermined temperature; and adjusting the first control temperature in response to the comparison between the minimum average temperature and the first predetermined temperature so as to maintain the average temperature within a particular range.

2. The method of claim 1 further comprising the step of:

adjusting the second control temperature in response to adjusting the first control temperature.

3. The method of claim 1 wherein the first predetermined temperature is derived from a speed of the blower.

4. The method of claim 1 further comprising the step of:

deriving the first control temperature from a speed of the blower.

5. The method of claim 1 further comprising the steps of:

comparing the average minimum temperature to a second predetermined temperature; and adjusting the first control temperature in response to the comparison of the minimum average temperature and the second predetermined temperature.

6. The method of claim 5 wherein the second predetermined temperature is derived from the first predetermined temperature, said first and second predetermined temperatures determining the particular range.

7. The method of claim 1 wherein the first control temperature is greater than the second control temperature.

8. A method of controlling a compressor clutch of an air conditioner system having an evaporator and a blower comprising the steps of:

monitoring a temperature at the evaporator;

disengaging the clutch when the monitored temperature decreases to a first control temperature;

engaging the clutch when the monitored temperature increases to a second control temperature;

deriving an average minimum temperature based on the monitored temperature;

comparing the average minimum temperature to a predetermined range of temperatures; and adjusting the first control temperature in a direction to cause the average minimum temperature to be within the predetermined range of temperatures.

9. The method of claim 8 wherein the adjusting step comprises:

increasing the first control temperature if the average minimum temperature is below the predetermined range of temperatures; and decreasing the first control temperature if the average minimum temperature is above the predetermined range of temperatures.

10. The method of claim 9 wherein the predetermined range of temperatures is derived from a speed of the blower.

11. The method of claim 10 wherein the air conditioning system has selectable air outlets and the predetermined range of temperatures is further derived from the selected air outlets.

12. An apparatus for controlling a compressor clutch of an air conditioner system having an evaporator and a blower comprising the steps of:

a temperature probe for monitoring a temperature at the evaporator;

a microprocessor communicatively connected to the temperature probe and the clutch for controlling the clutch in response to the monitored temperature, wherein the microprocessor disengages the clutch when the monitored temperature decreases to a first control temperature and engages the clutch when the monitored temperature increases to a second control temperature, said microprocessor determining an average minimum temperature based on the monitored temperature;

a first comparator for comparing the average minimum temperature to a first predetermined temperature, the first comparator generating a comparison signal; and means in communication with the first comparator for adjusting the first control temperature in response to the comparison signal.

13. The apparatus of claim 12 further comprising:

means in communication with the first comparator for adjusting the second control temperature in response to the adjustment of the first control signal.

14. The apparatus of claim 12 wherein the first predetermined temperature is derived from a speed of the blower.

15. The apparatus of claim 12 wherein the first control temperature is derived from a speed of the blower.

16. The apparatus of claim 12 further comprising:

a second comparator that compares the monitored temperature to a second predetermined temperature, the second comparator generating a second comparator signal; and means for adjusting the first control temperature in response to second comparator signal.

17. The apparatus of claim 16 wherein the second predetermined temperature is derived from the first predetermined temperature.

18. The method of claim 12 wherein the first control temperature is greater than the second control temperature.

19. An apparatus for controlling a compressor clutch of an air conditioner system having an evaporator and a blower comprising:

a temperature probe which monitors a temperature at the evaporator and produces a temperature signal in response thereto;

a microprocessor communicatively connected to the temperature probe and the clutch, said microprocessor controlling the clutch in response to the monitored temperature signal so as to disengage the clutch when the monitored temperature signal decreases to a level related to a first control temperature and engage the clutch when the monitored temperature signal increases to a level related to a second control temperature;

calculator circuit which receives the monitored temperature signal and derives an average minimum temperature based on the monitored temperature signal;

a comparator which compares the average minimum temperature signal to signals related to a predetermined range of temperatures, the comparator generating a comparison signal; and level adjustment circuit responsive to the comparison signal, said level adjustment circuit adjusts the first control temperature signal if a signal level of the average minimum temperature signal is not between the levels of the signals related to the predetermined range of temperatures.

20. The apparatus of claim 19 wherein the level adjustment circuit comprises:

an incrementing circuit which increases the level of the signal related to the first control temperature if the monitored temperature signal is below the levels of the signals related to the predetermined range of temperatures; and a decrementing circuit which decreases the level of the signal related to the first control temperature if the average minimum temperature signal is above the levels of the signals related to the predetermined range of temperatures.

21. The apparatus of claim 20 wherein the signals related to the predetermined range of temperatures are derived from a speed of the blower.

22. The apparatus of claim 20 wherein the air conditioning system has selectable air outlets and the signals related to the predetermined range of temperatures are further derived from the selection of air outlets.

* * * * *